(12) United States Patent
Tanemura (10) Patent No.: US 10,976,876 B2
(45) Date of Patent: Apr. 13, 2021

(54) CONDUCTIVE GUIDES FOR PROXIMITY SENSING DEVICES

(71) Applicant: Synaptics Incorporated, San Jose, CA (US)

(72) Inventor: Tetsuo Tanemura, Tokyo (JP)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/439,049

(22) Filed: Jun. 12, 2019

(65) Prior Publication Data

US 2019/0384453 A1    Dec. 19, 2019

Related U.S. Application Data (60) Provisional application No. 62/686,590, filed on Jun. 18, 2018.

(51) Int. Cl.
*G06F 3/044* (2006.01)
*H04M 1/02* (2006.01)

(52) U.S. Cl.
CPC .......... *G06F 3/0443* (2019.05); *H04M 1/026* (2013.01); *G06F 2203/04108* (2013.01); *H04M 2250/22* (2013.01)

(58) Field of Classification Search
CPC ........ G06F 3/0443; G06F 2203/04108; H04M 1/026; H04M 2250/22
See application file for complete search history.

(56) References Cited

U.S. PATENT DOCUMENTS

| | | | |
|---|---|---|---|
| 9,766,756 B2 * | 9/2017 | Yoshida | ................... G06F 3/044 |
| 10,078,406 B2 | 9/2018 | Tanemura et al. | |
| 2017/0153749 A1 * | 6/2017 | Noguchi | ................ G06F 3/0443 |
| 2017/0308200 A1 * | 10/2017 | Mugiraneza | ...... G02F 1/134336 |
| 2018/0018029 A1 * | 1/2018 | Lim | ..................... G06F 3/03545 |

* cited by examiner

*Primary Examiner* — Lisa S Landis
(74) *Attorney, Agent, or Firm* — Paradice & Li LLP (57) ABSTRACT

An input device includes a plurality of sensor electrodes and a conductive guide. The sensor electrodes may be configured to sense an electric field within a sensing region. A first portion of the conductive guide may be configured to contact an input object outside the sensing region. A second portion of the conductive guide may be configured to interact with the electric field. The input device may include a processing system couple to the plurality of sensor electrodes to evaluate the electric field from the plurality of sensor electrodes and determine whether an input object is in contact with the first portion of the conductive guide.

16 Claims, 9 Drawing Sheets

CONDUCTIVE GUIDES FOR PROXIMITY SENSING DEVICES

CROSS-REFERENCE TO RELATED APPLICATION

This application claims the benefit of and commonly owned U.S. Provisional Patent Application No. 62/686,590 entitled "CAPACITIVE COUPLED FINGER GUIDE FOR SIDETOUCH" filed on Jun. 18, 2018, the entirety of which is hereby incorporated by reference.

TECHNICAL FIELD

This disclosure relates generally to proximity sensing devices, and more specifically to proximity sensing devices with conductive guides.

BACKGROUND OF RELATED ART

Input devices, including proximity sensor devices (also commonly referred to as touchpads or touch sensor devices), are widely used in a variety of electronic systems. A proximity sensor device typically includes a sensing region, often associated with a surface, in which the proximity sensor device determines the presence, location, and/or motion of one or more input objects. Input objects are often in contact with the surface of the proximity sensor device. Proximity sensor devices may provide an input interface for an electronic system. For example, proximity sensor devices may be used as input devices for larger electronic systems (such as opaque touchpads integrated in, or peripheral to, notebook or desktop computers). Proximity sensor devices may also be used in smaller electronics systems (such as touch screens integrated with cellular phones).

For some applications, it may be desirable to detect the presence of an input object that is beyond the sensing region of the proximity sensor device. For example, an electronic system may include one or more detection regions serviced by push buttons positioned outside the sensing region. The push buttons may detect an input outside the sensing region, but also may add cost to the electronic system. Detection of the input object outside the sensing region by the proximity sensor device may be preferable to reduce the cost.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An input device with a conductive guide is disclosed. The input device may include a substrate comprising a first sensor electrode and a conductive guide. The first sensor electrode may be configured to sense an electric field within a sensing region. The conductive guide may include a first portion configured to contact an input object outside the sensing region and a second portion configured to interact with the electric field. The input device also may include a processing system coupled to the first sensor electrode. The processing system may be configured to evaluate electric field data from the first sensor electrode and determine whether an input object is in contact with the first portion of the conductive guide based at least in part on the electric field data.

An electronic system is disclosed. The electronic system may include an input device. The input device may include a substrate comprising a first sensor electrode and a conductive guide. The first sensor electrode may be configured to sense an electric field within a sensing region. The conductive guide may include a first portion configured to contact an input object outside the sensing region and a second portion configured to interact with the electric field. The electronic system may include one or more processors and a memory storing instructions that, when executed by the one or more processors, cause the electronic system to evaluate electric field data from the first sensor electrode and determine whether an input object is in contact with the conductive guide based at least in part on the electric field data.

BRIEF DESCRIPTION OF THE DRAWINGS

The present embodiments are illustrated by way of example and are not intended to be limited by the figures of the accompanying drawings.

DETAILED DESCRIPTION

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present disclosure, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. The term "processor," as used herein may refer to any general purpose processor, conventional processor, controller, microcontroller, and/or state machine capable of executing scripts or instructions of one or more software programs stored in memory.

Determining the presence of a finger or other input object outside of a sensing region of a traditional proximity sensor device may be difficult. For example, an electronic system may include a traditional proximity sensor, such as a touch pad or the like, to detect a variety of input objects. The traditional proximity sensor may include sensor electrodes that are sensitive to an input object within a sensing region but are not sensitive to an input object outside the sensing region.

In some implementations, a proximity sensor may include one or more conductive guides. The conductive guides may enable a finger or other input object to be detected by the proximity sensor device while the input object is positioned outside the sensing region.

Figure 1:
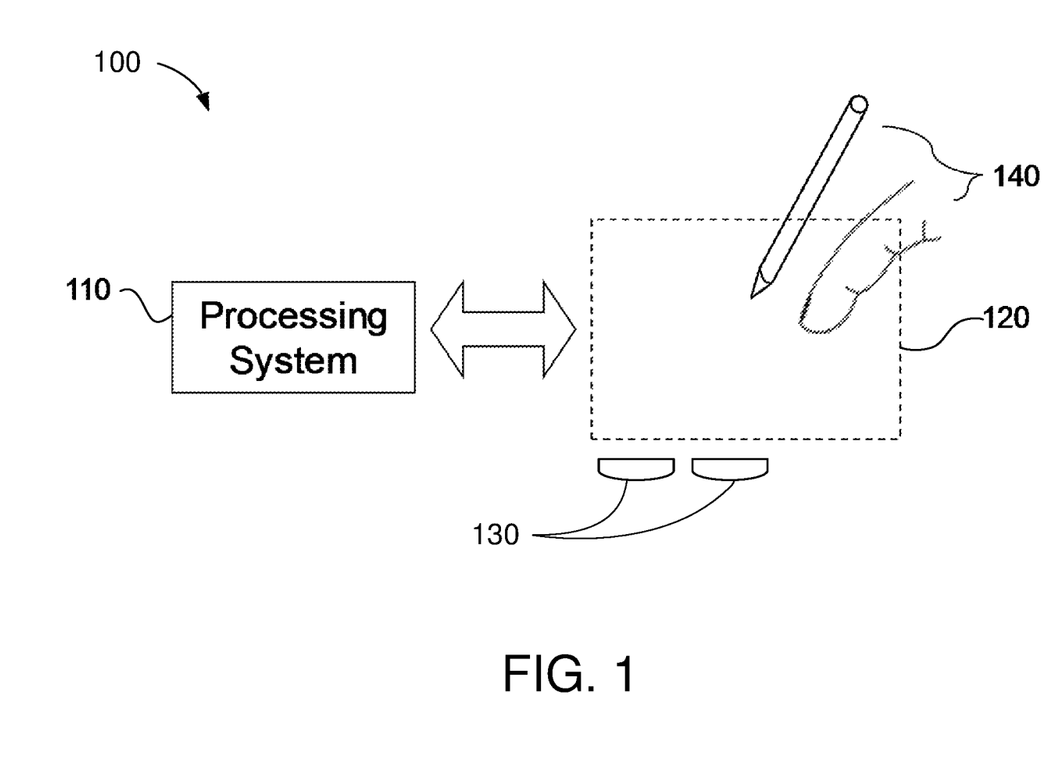
FIG. 1 shows an example input device in accordance with some implementations.

FIG. 1 shows an example input device 100 in accordance with some implementations. The input device 100 may include a processing system 110, a sensing region 120, and conductive guides 130. Although two conductive guides 130 are shown, in other implementations, the input device 100 may include any feasible number of conductive guides 130. The conductive guides 130 may be formed from electrically conductive material, and/or from any material with a suitable dielectric constant.

The input device 100 may be configured to provide user input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example technologies may include Inter-Integrated Circuit (I²C), Serial Peripheral Interface (SPI), PS/2, Universal Serial bus (USB), Infrared Data Association (IrDA), and various RF communication protocols.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some implementations, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof. In some implementations, input surfaces may be provided by, and/or projected on, one or more surfaces of a housing of the input device 100 (e.g., as an image).

The input device 100 may use various sensing technologies to detect user input. Example sensing technologies may include capacitive, elastive, resistive, inductive, magnetic, acoustic, ultrasonic, and optical sensing technologies. In some implementations, the input device 100 may use capacitive sensing technologies to detect user inputs. For example, the sensing region 120 may include one or more capacitive sensing elements (e.g., sensor electrodes) to create an electric field. In some implementations, the sensor electrodes may be disposed on a surface, plane, or substrate associated with the sensing region 120. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may use resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods may detect changes in the capacitive coupling between sensor electrodes and an input object. For example, an input object near the sensor electrodes may alter the electric field near the sensor electrodes, thus changing the measured capacitive coupling. In some implementations, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground reference voltage.

Transcapacitance sensing methods may detect changes in the capacitive coupling between sensor electrodes. For example, an input object near the sensor electrodes may alter the electric field between the sensor electrodes, thus changing the measured capacitive coupling of the sensor electrodes. In some implementations, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

In some implementations, the conductive guides 130 may be positioned near one or more sensor electrodes enabling the detection of an input object 140 outside of the sensing region 120. Electric fields near the sensor electrodes may be affected when an input object 140 comes into contact with one of the conductive guides 130. That is, through the conductive guides 130, the input object 140 may affect and/or interact with the electric fields of the sensor electrodes even though the input object is outside of the sensing region 120.

In some implementations, the conductive guides 130 may be supported or mounted by a case or chassis (not shown). Generally, the dielectric constant of the conductive guides 130 should be much greater than the dielectric constant of air (e.g., much greater than 1) and sufficiently different (for example, a 2 times difference) from the dielectric constant of the surrounding material or area to enable the sensors electrodes to distinguish between a response due to the input object 140 touching the conductive guide 130 verses due to the input object 140 touching the surrounding area. For example, if the case has a relatively low dielectric constant of between 3-5, then the conductive guides 130 may be formed from a material with a dielectric constant of between 6-10. In another example, if the case has a relatively high dielectric constant (such as a case formed from a metal which may have a dielectric constant of greater than 40), then the conductive guides 130 may have dielectric constant of 8. In some implementations, isolating the conductive guides 130 from the case may provide more possible materials for the conductive guides 130, particularly when the case has a high electric constant. Isolating the conductive guides 130 is discussed in more detail below in conjunction with FIG. 4B.

The processing system 110 may be configured to operate the hardware of the input device 100 to detect inputs in the sensing region 120 and/or input objects outside the sensing region via the conductive guides 130. In some implementations, the processing system 110 may control one or more sensor electrodes to detect input objects in the sensing region 120 and/or input objects in contact with at least one of the conductive guides 130. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some implementations, the processing system 110 may be implemented as a set of modules that are implemented in firmware, software, or a combination thereof. Example modules include hardware operation modules for operating hardware such as sensor electrodes and display screens, data processing modules for processing data such as sensor signals and positional information, and reporting modules for reporting information. In some implementations, the processing system 110 may include sensor operation modules configured to operate sensing elements to detect user input in the sensing region 120 and detect user input outside the sensing region via the conductive guides 130, identification modules configured to identify gestures such as mode changing gestures, and mode changing modules for changing operation modes of the input device 100 and/or electronic system.

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

Figure 2:
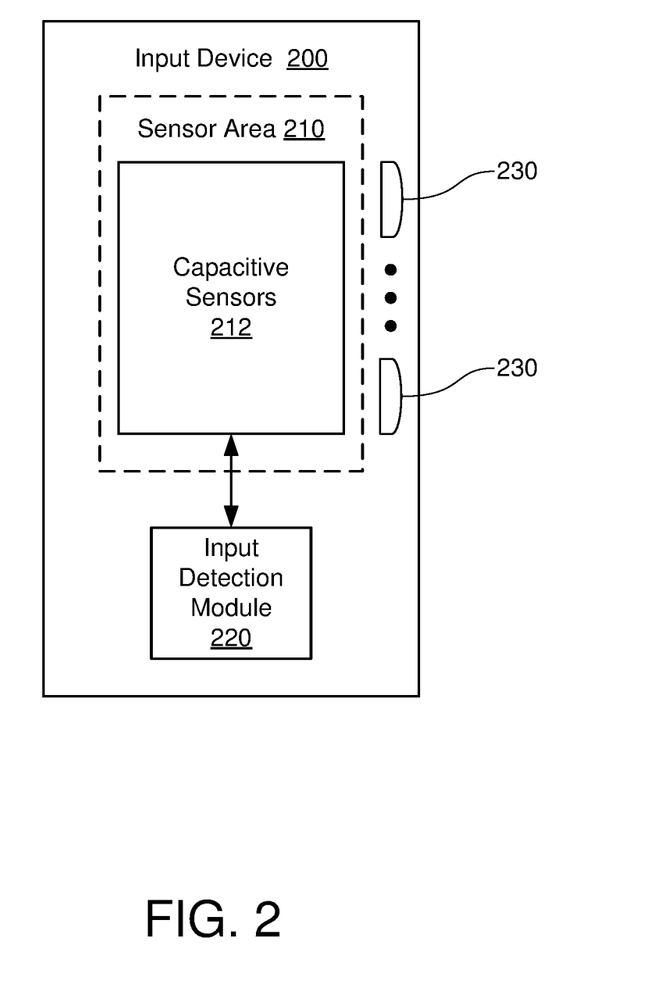
FIG. 2 is a block diagram of an input device, in accordance with some implementations.

FIG. 2 is a block diagram of an input device 200, in accordance with some implementations. The input device 200 may be an implementation of the input device 100 of FIG. 1. The input device 200 may include a sensor area 210, an input detection module 220, and conductive guides 230. The size, shape, and/or location of the sensor area 210 may vary depending on actual implementations. Although only two conductive guides 230 are shown, the input device 200 may include any feasible number of conductive guides 230.

In some implementations, the sensor area 210 may include, or otherwise be coupled to, capacitive sensors 212. For example, the capacitive sensors 212 may include an array of sensor electrodes that create an electric field in and/or around the sensor area 210. The input device 200 may sense user inputs by detecting or evaluating changes in capacitance or electric fields through the capacitive sensors 212. In some implementations, the capacitive sensors 212 may include transmitter sensor electrodes and receiver sensor electrodes (not shown for simplicity).

The capacitive sensors 212 may be coupled to the input detection module 220. The input detection module 220, which may be implemented by, or include at least a portion of, a processing system (such as the processing system 110 of FIG. 1), controls operation of the capacitive sensors 212. For example, the input detection module 220 may operate the capacitive sensors 212 to determine a pressure and/or position associated with an input object.

The conductive guides 230 may be positioned separate and away from the sensor area 210. The conductive guides 230 may enable an input object (not shown) in contact with the conductive guides 230 to interact with electric fields associated with the capacitive sensors 212, even when the input object is outside of a sensing region associated with the capacitive sensors 212. Interaction between the conductive guides 230 and the electric fields are discussed in more detail below in conjunction with FIGS. 3B-3D.

Figure 3A:
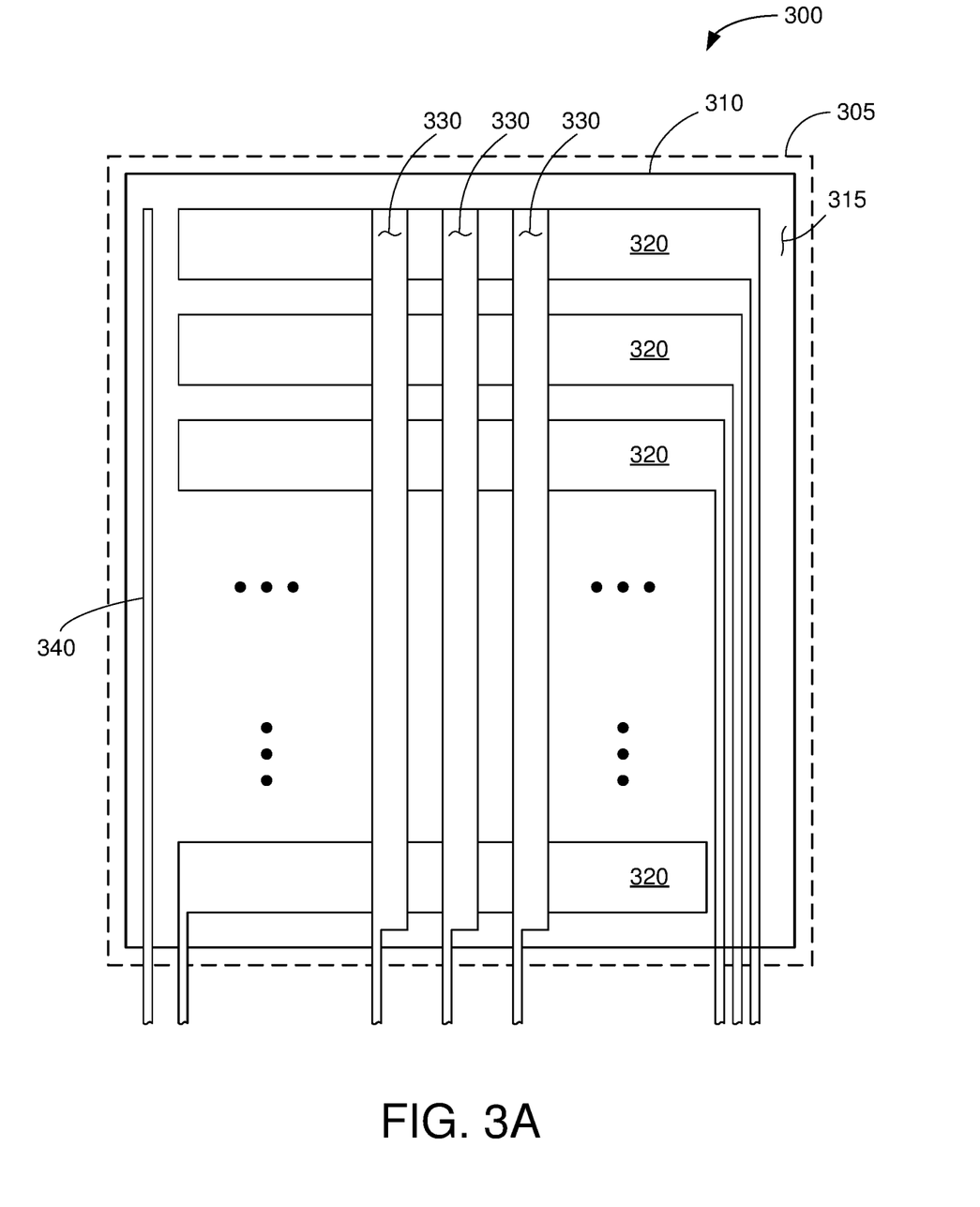
FIG. 3A shows an input device, in accordance with some implementations.

FIG. 3A shows an input device 300, in accordance with some implementations. The input device 300 may be an example implementation of the input devices 100 and 200 of FIGS. 1 and 2 and may include a sensor area 310. The sensor area 310 may include a substrate 315, one or more first sensor electrodes 320, one or more second sensor electrodes 330, and a third sensor electrode 340. Persons having skill in the art will appreciate that the input device 300 may include any feasible number of first sensor electrodes 320, second sensor electrodes 330, and/or third sensor electrodes 340. In some implementations, an input device 300 may determine a location or presence of an input object by determining a transcapacitance as discussed above with respect to FIG. 1.

The substrate 315 may provide a platform or surface to support the first sensor electrodes 320, the second sensor electrodes 330, and the third sensor electrode 340. In some implementations, the substrate 315 may be any feasible material such as, but not limited to, fiberglass, plastic, glass, or the like. The first sensor electrodes 320, the second sensor electrodes 330, and the third sensor electrode 340 may form, at least in part, a capacitive sensor array. In some implementations, the first sensor electrodes 320 may be transmitter electrodes and the second sensor electrodes 330 may be receiver electrodes. The transmitter electrodes may transmit modulated signals and the receiver electrode may receive the modulated signals from the transmitter electrodes. In some other implementations, the first sensor electrodes 320 may be receiver electrodes and the second sensor electrodes 330 may be transmitter electrodes. The signals received by the second sensor electrodes 330 may be affected when the input object is within a sensing region 305. Therefore, in a first mode of operation a presence and/or motion of the input object within the sensing region 305 may be determined by an analysis or evaluation of the signals received by the second sensor electrode 330. In some implementations, the analysis or evaluation may be performed by the input detection module 220 of FIG. 2.

Although the first sensor electrodes 320 are shown as horizontal electrodes and the second sensor electrodes 330 are shown as a vertical electrode, persons having skill in the art will appreciate that the first sensor electrodes 320 and the second sensor electrodes 330 may be implemented in any technically feasible shape. For example, the first sensor electrodes 320 may be implemented with vertical elements and the second sensor electrodes 330 may be implemented with horizontal elements. In other implementations, the first sensor electrodes 320 and the second sensor electrodes 330 may have a circular, semi-circular, spiral, diagonal or other shape. Furthermore, the first sensor electrodes 320 may have different dimensions with respect to the second sensor electrode 330. For example, the first sensor electrodes 320 may have a wider width, a larger shape and/or displace more area than the second sensor electrodes 330. Thus, a transmitter electrode may be wider than a receiver electrode. Alternatively, the second sensor electrodes 330 may have a wider width, a larger shape, and/or displace more area than the first sensor electrodes 320 making a receiver electrode wider than a transmitter electrode.

The first sensor electrodes 320, the second sensor electrodes 330, and the third sensor electrode 340 may include traces to couple the electrodes to an input detection module (such as the input detection module 220 of FIG. 2), for example, to measure voltages or currents and evaluate electric fields. In the example of FIG. 3, the traces are shown routed toward the bottom of the sensor area 310. In other implementations, the traces may be routed in any feasible direction.

In some implementations, the third sensor electrode 340 may be disposed adjacent and parallel to one edge of the sensor area 310 or the substrate 315. So positioned, the third sensor electrode 340 may be sensitive to an electric field that may be beyond the sensor area 310 or the substrate 315.

The third sensor electrode 340 may be used to detect the presence of an input object when the input object is outside the sensing region 305. Thus, the input object may be beyond a sensitivity range of the first sensor electrodes 320 and the second sensor electrodes 330. For example, if the input device 300 is positioned within an electronic system such as a smart phone, the third sensor electrode 340 may be used to detect an input object on the side of the smart phone, outside the sensing region 305. In contrast, using traditional input devices, the side of the smart phone may be too far and/or shielded from the sensing region 305 to detect any changes in electric fields. Operation of the third sensor electrode 340 is described below in conjunction with FIGS. 3B-3C.

Figure 3B:
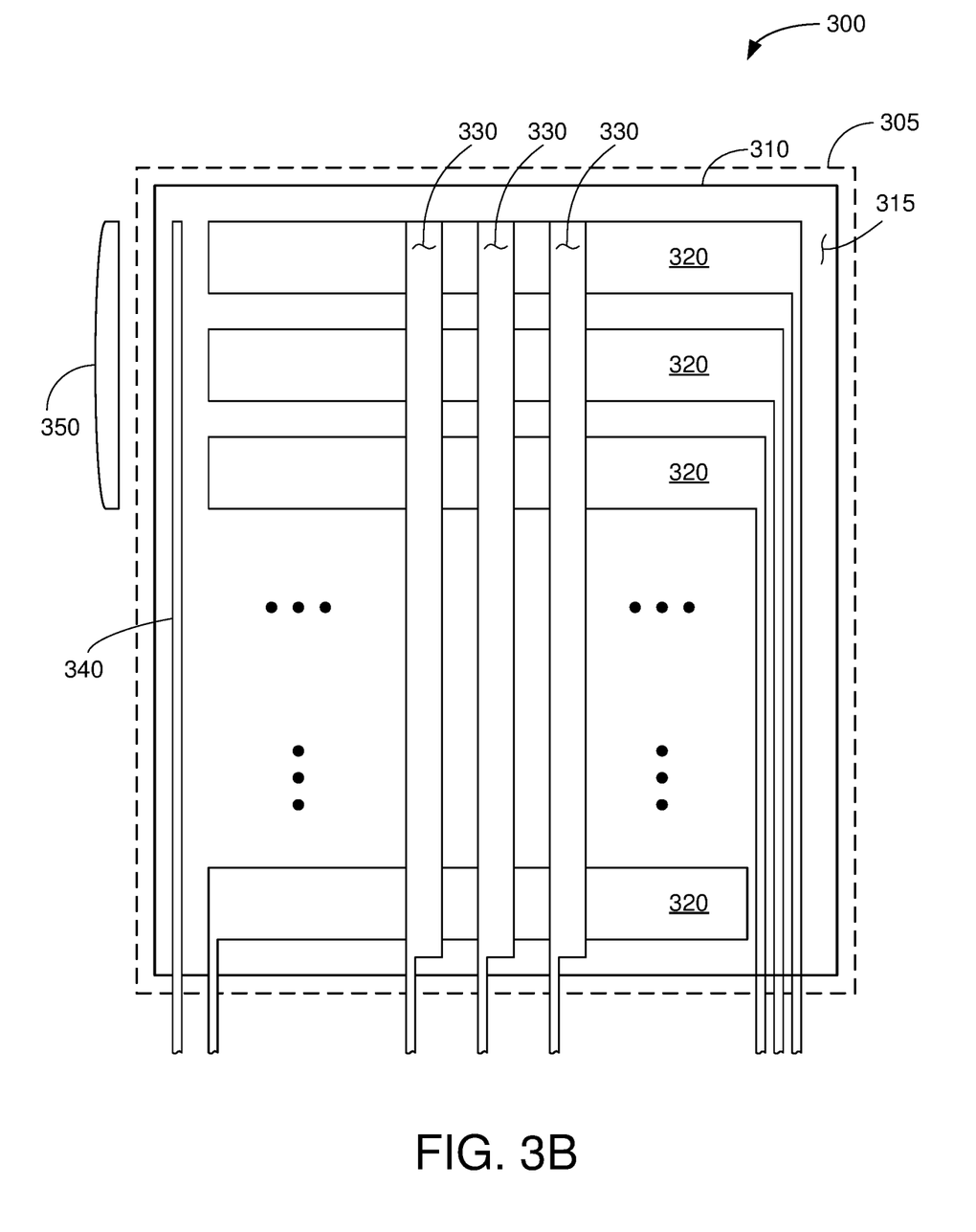
FIG. 3B shows the input device of FIG. 3A including a conductive guide, in accordance with some implementations.

FIG. 3B shows the input device 300 of FIG. 3A including a conductive guide 350. The sensing region 305, the sensor area 310, the substrate 315, the first sensor electrodes 320, the second sensor electrodes 330, and the third sensor electrode 340 of FIG. 3B may be similar to the like-named and numbered elements of FIG. 3A. In a first mode of operation, the input device 300 may detect a presence and/or motion of an input object (not shown) within the sensing region 305. In addition, in a second mode of operation, the conductive guide 350 may enable the detection, presence or motion of the input object outside the sensing region 305.

The conductive guide 350 may be disposed adjacent and parallel to an edge of the sensor area 310 or the substrate 315. In some implementations, the third sensor electrode 340 may be disposed between the conductive guide 350 and the first sensor electrodes 320. The conductive guide 350 may be formed from an electrically conductive material and/or have a suitable dielectric constant thereby enabling the input object to affect and/or interact with an electric field between the first sensor electrodes 320 and the third sensor electrode 340. In some implementations, the conductive guide 350 may include a first portion to contact the input object outside the sensing region 305 and a second portion to interact with the electric field. For example, an electric field may originate from one of the first sensor electrodes 320 and be received by the third sensor electrode 340. When an input object comes in contact with the first portion of the conductive guide 350, the electric field near the second portion of the conductive guide 350 may be affected, allowing the input object to be detected.

The conductive guide 350 may not only enable an input object outside the sensing region 305 to modify an electric field, but may also provide a tactile registration element to provide consistent placement of the input object. For example, the conductive guide 350 may protrude from the side of an electronic system to provide the user a well-defined region to touch or present the input object. In some embodiments, the conductive guide 350 also may provide a contrast in texture to enable the user to locate the conductive guide 350 by touch.

In some implementations, two or more first sensor electrodes 320 may be used to transmit an electric field to the third sensor electrode 340. Using multiple first sensor electrodes 320 to transmit an electric field may increase an associated signal to noise ratio (SNR) related to an electric field measurement. In addition, one or more first sensor electrodes 320 may be used to determine the position of the input object in contact with the conductive guide 350 based on an analysis of associated electric field measurements.

In some implementations, the third sensor electrode 340 may be implemented as a trace having a width of not greater than 0.2 mm. Such a trace width may reduce coupling noise from adjacent items such as, but not limited to, a co-located display. In addition, a trace width of not greater than 0.2 mm may reduce any affects from unintended hovering fingers or other input objects.

In some implementations, two or more conductive guides may be used with the input device 300. One example implementation is discussed below in conjunction with FIG. 3C.

Figure 3C:
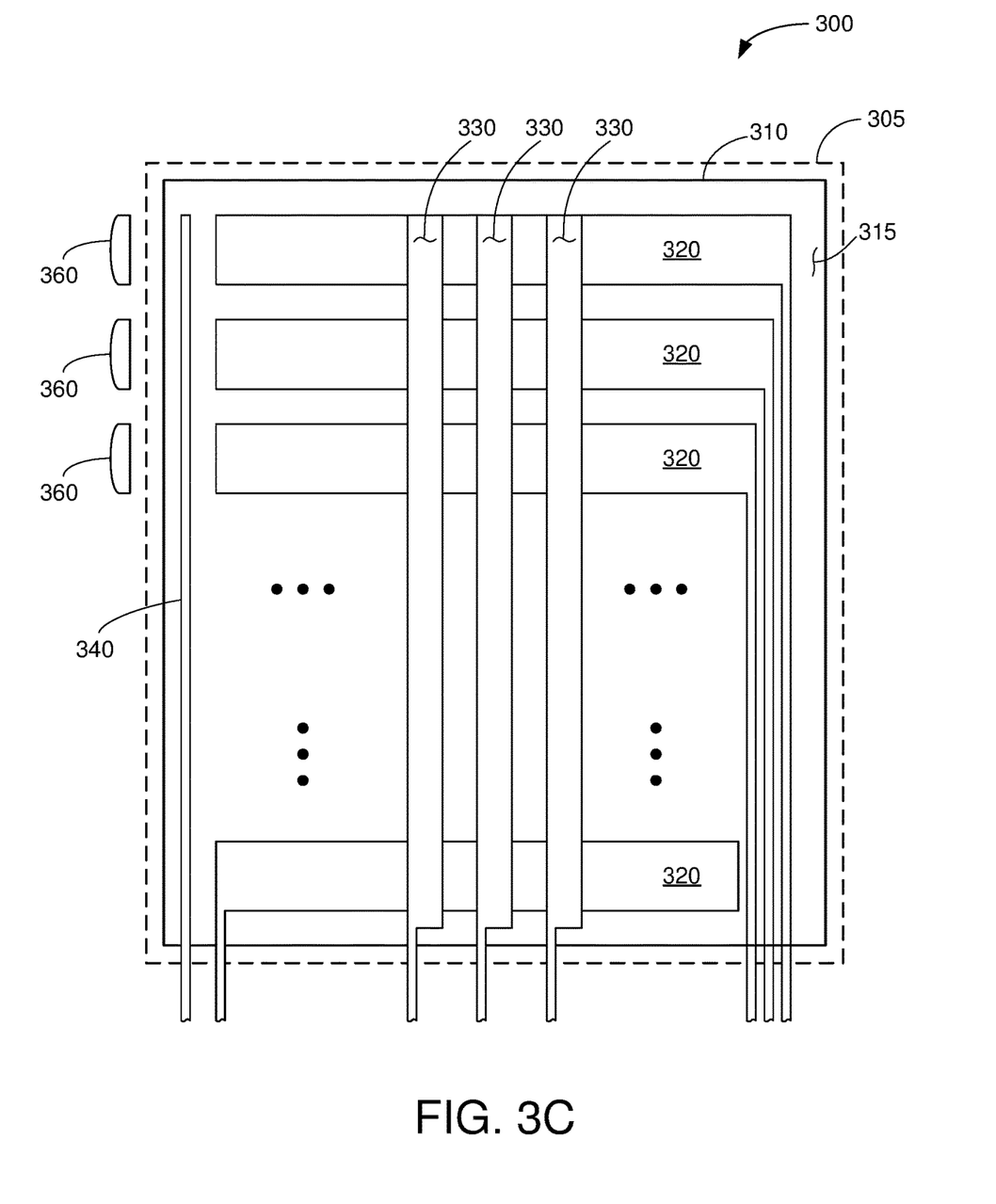
FIG. 3C shows the input device of FIG. 3A including a plurality of conductive guides, in accordance with some implementations.

FIG. 3C shows the input device 300 of FIG. 3A including a plurality of conductive guides 360 in accordance with some implementations. The sensing region 305, the sensor area 310, the substrate 315, the first sensor electrodes 320, the second sensor electrodes 330, and the third sensor electrode 340 may be similar to the like-named and numbered elements of FIGS. 3A-3B. Similar to as discussed above with respect to FIG. 3B, in a first mode of operation, the input device 300 may detect a presence or motion of an input object (not shown) within the sensing region 305. Further, in a second mode of operation the conductive guides 360 may enable detection of a presence or motion of the input object outside the sensing region 305.

Although only three conductive guides 360 are shown, in other implementations, the input device 300 may include any feasible number of conductive guides 360. Similar to the conductive guide 350 of FIG. 3B, the conductive guides 360 may be disposed adjacent and parallel to an edge of the sensor area 310 and/or the substrate 315 and adjacent to the third sensor electrode 340. In some implementations, the third sensor electrode 340 may be disposed between the conductive guides 360 and the first sensor electrodes 320.

The conductive guides 360 may operate similar to the conductive guide 350 discussed above with respect to FIG. 3B. In addition, the multiple conductive guides 360 may provide a plurality of distinct regions outside the sensing region 305 with which to detect an input object. In some implementations, a subset of available first sensor electrodes 320 may transmit modulated signals to the third sensor electrode 340 to detect an input object in contact with a particular conductive guide 360. For example, a first sensor electrode 320 nearest a first conductive guide 360 may transmit modulated signals to the third sensor electrode 340 to sense an input object. A different first sensor electrode 320 may be used to sense an input object through a different conductive guide 360. In some other implementations, two or more first sensor electrodes 320 may be used to transmit the modulated signals to the third sensor electrode 340 to detect the input object through one conductive guide 360. For example, two first sensor electrodes 320 may transmit modulated signals to the third sensor electrode 340 to detect the input object through one conductive guide 360. Using multiple first sensor electrodes 320 to transmit an electric field may increase an associated SNR.

Figure 3D:
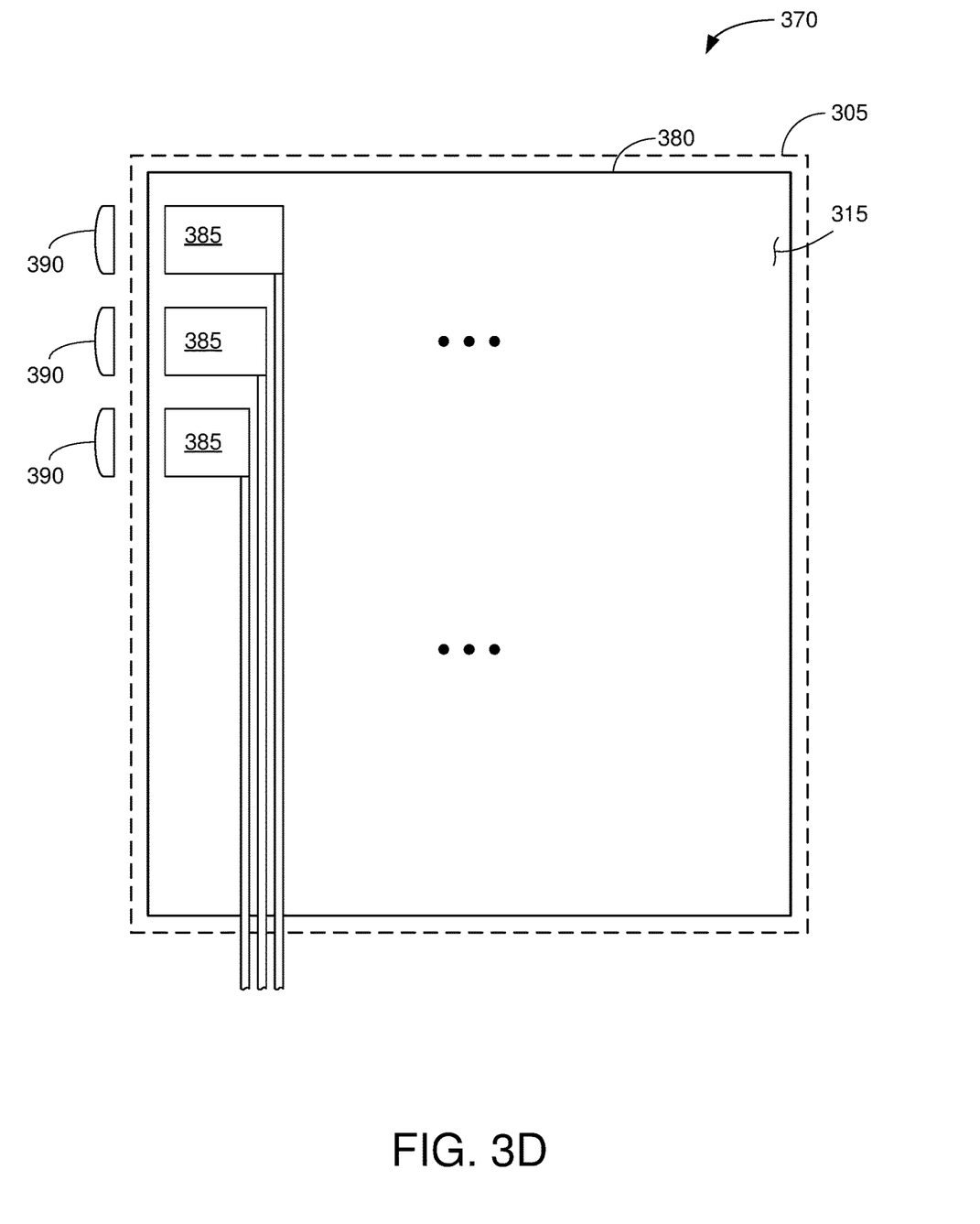
FIG. 3D shows another implementation of an input device including a plurality of conductive guides, in accordance with some implementations.

FIG. 3D shows an input device 370 including a plurality of guides 390, in accordance with some implementations. The input device 370 may be an example implementation of the input devices 100 and 200 of FIGS. 1 and 2. The input device 370 may include a sensor area 380. The sensor area 380 may include a substrate 315 and a plurality of sensor electrodes 385. Although only three sensor electrodes 385 are shown for simplicity, the sensor area 380 may include any feasible number of sensor electrodes 385. The input device 370 may include a plurality of conductive guides 390. Although only three conductive guides 390 are shown, the input device 370 may include any feasible number of conductive guides 390.

The input device 370 may detect an input object (not shown) within the sensing region 305 by measuring an absolute capacitance associated with the plurality of sensor electrodes 385 instead of measuring a transcapacitance as discussed with respect to FIGS. 3A-3C. Thus, in a first mode of operation, the input device 370 may detect the input object in the sensing region 305 by measuring an associated absolute capacitance. Further, in a second mode of operation the input device 370 may detect the input object outside the sensing region 305 and in contact with one or more of the conductive guides 390. In some implementations, each conductive guide 390 may be proximate to a corresponding sensor electrode 385. Thus, a sensor electrode 385 may detect changes in an electric field caused by an input object near or in contact with a conductive guide 390.

Figure 4A:
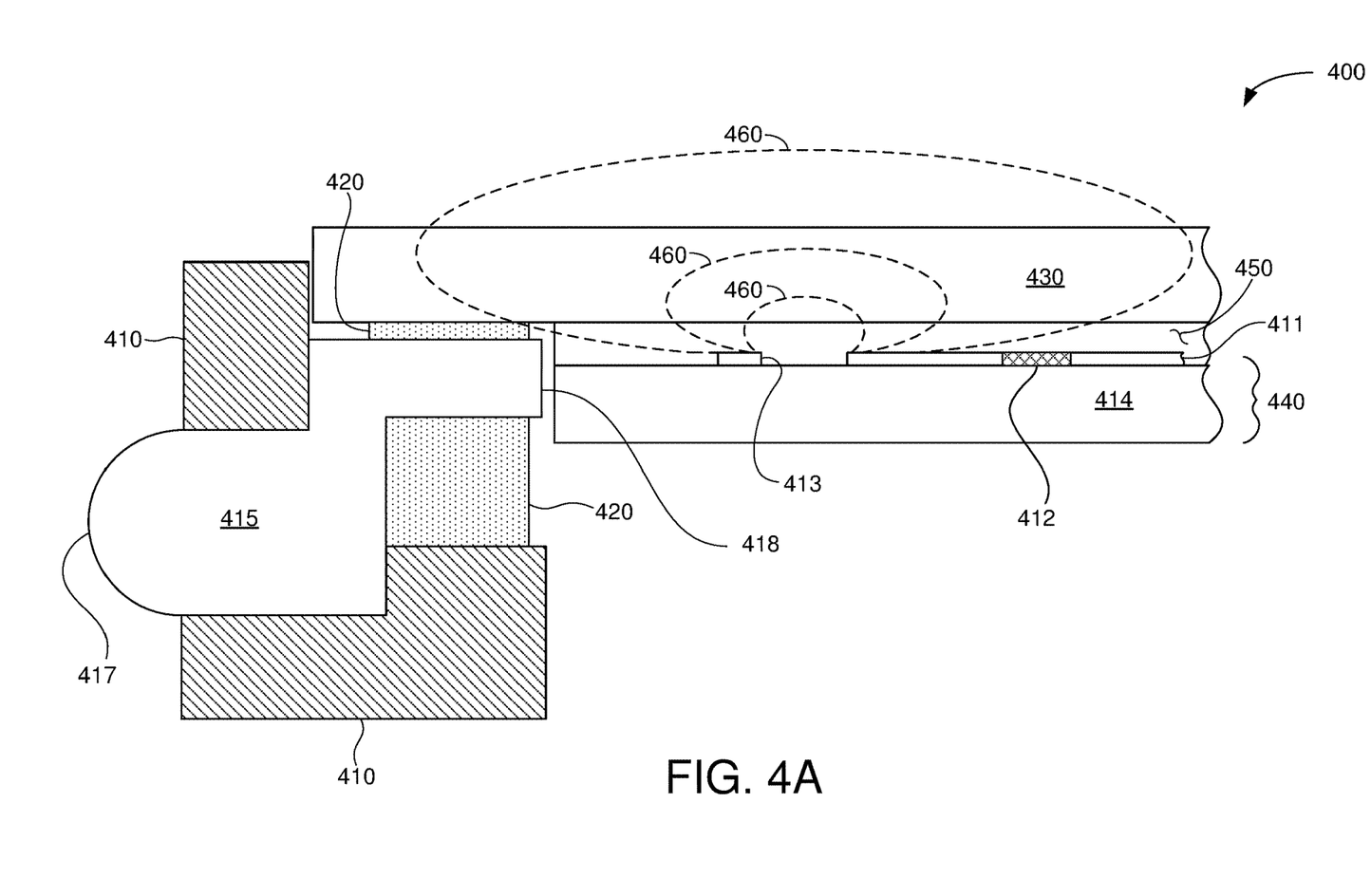
FIG. 4A is a simplified cross-sectional view of an electronic system.

FIG. 4A is simplified cross-sectional view of an electronic system 400. The electronic system 400 may include a case 410, a gasket 420, a cover glass 430, and an input device 440.

The input device 440 may be an implementation of the input devices 100, 200, and 300 of FIGS. 1, 2, and 3A-3C. The input device 440 may include a first sensor electrode 411, a second sensor electrode 412, a third sensor electrode 413, a substrate 414, and a conductive guide 415. The input device 440 may include other first sensor electrodes, second sensor electrodes, conductive guides and the like that are not shown to ease explanation. For example, the input device 440 may include additional first sensor electrodes, additional second sensor electrodes, a processing system and/or one or more support circuits.

The first sensor electrode 411, the second sensor electrode 412, and the third sensor electrode 413 may be disposed on the substrate 414. The first sensor electrode 411, the second sensor electrode 412, and the third sensor electrode 413 may be example implementations of the first sensor electrode 320, the second sensor electrode 330, and the third sensor electrode 340, respectively, of FIGS. 3A-3D. In some implementations, the substrate 414 may include two or more substrates (not shown for simplicity) such as a touch substrate (to act as a platform to provide support for one or more sensor electrodes) and a display substrate for a co-located display. In some implementations, an optically clear adhesive 450 may be used to affix at least a portion of the input device 440 to the cover glass 430. The cover glass 430 (and therefore a portion of the input device 440) may be attached and/or mounted to the case 410 by the gasket 420. In other implementations, the cover glass 430 and the input device 440 may be attached and/or mounted to the case 410 by any other feasible material, device or mechanism. For example, the cover glass 430 and the input device 440 may be attached to the case 410 with an adhesive such as a pressure sensitive adhesive in addition to, or in place of, the gasket 420.

In some implementations, the conductive guide 415 may be affixed in contact with (e.g., touching) the case 410. The case 410 may be formed from a non-conductive material such as a polymer, plastic or other insulating material. Thus, the case 410 may not reduce the effectiveness of the conductive guide 415 to interact with an electric field as described above with respect to FIGS. 3B-3D. In other words, the case 410 may not conduct (redirect) the effects of an input object away from the conductive guide 415.

In a first mode of operation, the first sensor electrode 411 may transmit an electric field that may be received by the second sensor electrode 412. Thus, in the first mode of operation the input device 440 may detect the input object within a sensing region (not shown) near the cover glass 430.

In a second operating mode, the first sensor electrode 411 may transmit an electric field that may be received by the third sensor electrode 413. If an input object comes in contact with a first portion 417 of the conductive guide 415, then a second portion 418 of the conductive guide 415 may affect or interact with an electric field 460 from the first sensor electrode 411 to the third sensor electrode 413, thereby enabling detection of the input object. Example electric field lines 460 are illustrated with dashed lines in FIG. 4A to show a possible interaction with the conductive guide 415. Actual electric field lines may be similar or different.

Figure 4B:
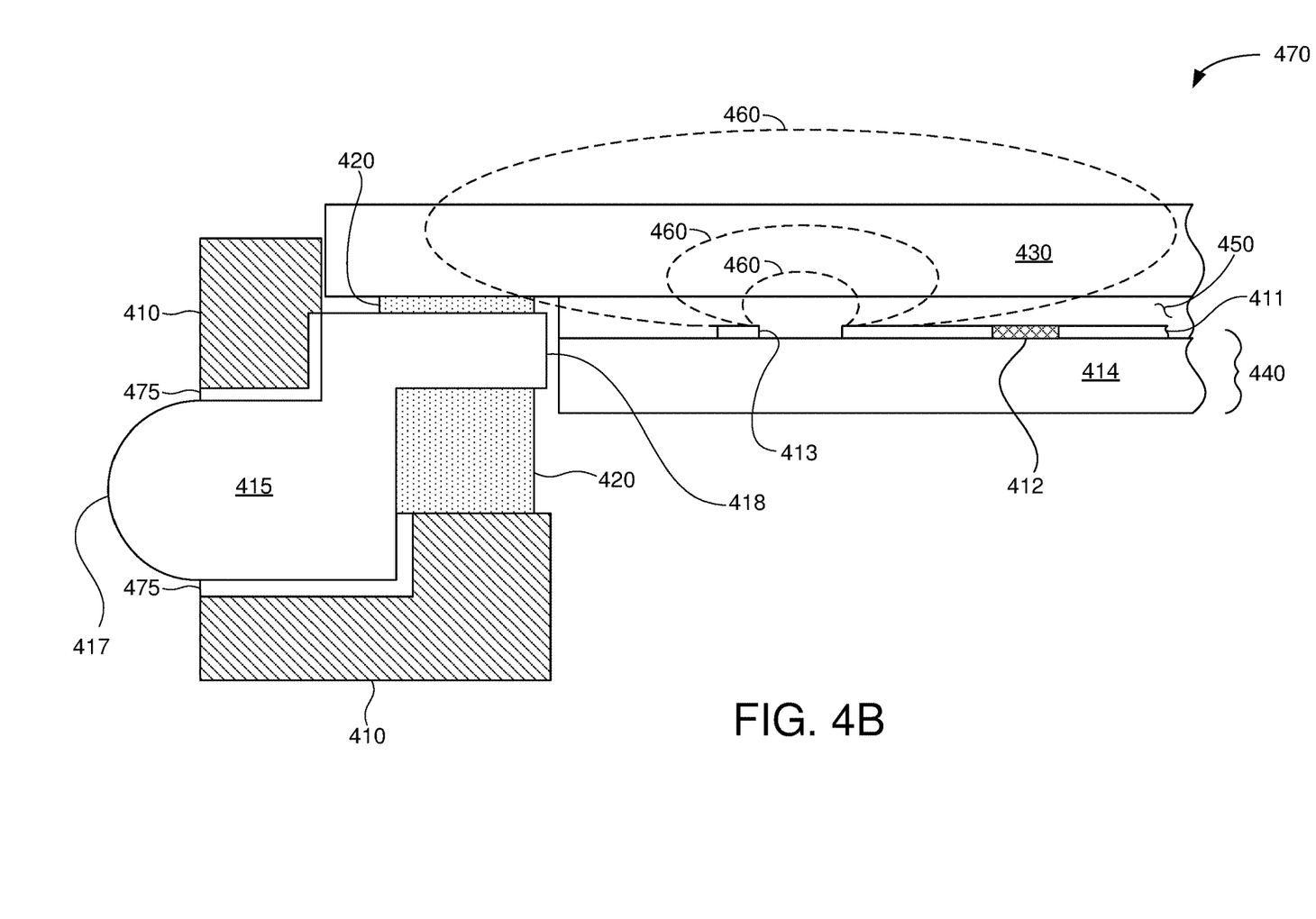
FIG. 4B is a simplified cross-sectional view of another electronic system.

FIG. 4B is simplified cross-sectional view of an electronic system 470. The electronic system 470 may include the case 410, the gasket 420, the cover glass 430, and the input device 440 as described above with respect to FIG. 4A. Thus, the input device 440 may include the first sensor electrode 411, the second sensor electrode 412, the third sensor electrode 413, the substrate 414, and the conductive guide 415. In addition, the electronic system 470 may include an insulator 475.

In some implementations, the case 410 may be formed from a conductive material and the conductive guide 415 may be affixed in contact with the case 410. Thus, the case 410 may "conduct" capacitive effects of an input object (not shown) away from the conductive guide 415. To remove unwanted effects of the conductive case 410, the electronic system 470 may include the insulator 475 disposed to isolate the conductive guide 415 from the case 410.

Similar to the electronic system 400 of FIG. 4A, in a first mode of operation, the first sensor electrode 411 may transmit an electric field that may be received by the second sensor electrode 412. Thus, in the first mode of operation, the input device 440 may detect the input object within a sensing region near the cover glass 430.

In a second operating mode, the first sensor electrode 411 may transmit an electric field that may be received by the third sensor electrode 413. If an input object comes in contact with the first portion 417 conductive guide 415 (isolated from the case 410 by the insulator 475), then the second portion 418 of the conductive guide 415 may affect and/or interact with an electric field 460 from the first sensor electrode 411 to the third sensor electrode 413, thereby enabling detection of the input object.

Figure 5:
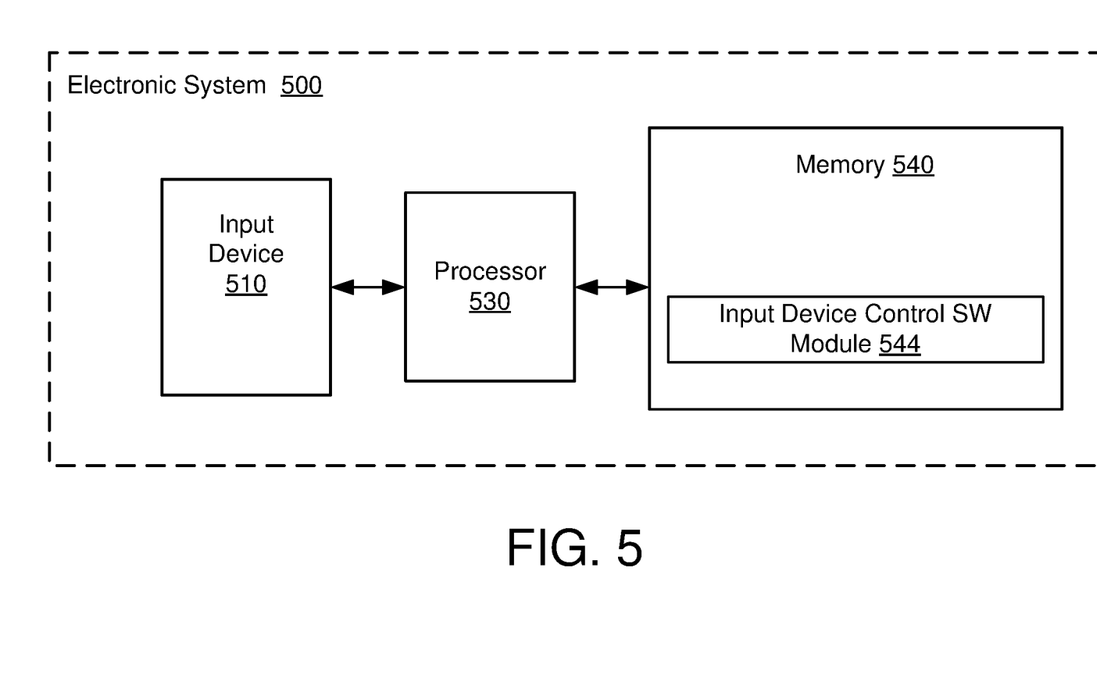
FIG. 5 is a block diagram of an example electronic system.

FIG. 5 is a block diagram of an example electronic system 500. The electronic system 500 may include an input device 510, a processor 530, and a memory 540. The input device 510 may be an implementation of the input devices 100, 200, 300, 370, and 440 of FIGS. 1-4. The input device 510 may be coupled to, and at least partially controlled by the processor 530. In some implementations, the processor 530 may provide the functionality of the processing system 110 described above with respect to FIG. 1.

The memory 540 may include a non-transitory computer-readable storage medium (such as one or more nonvolatile memory elements, such as EPROM, EEPROM, Flash memory, a hard drive, and so on) that may store an input device control software (SW) module 544 to control operations of the input device 510.

The processor 530, which may be coupled to the input device 510, and the memory 540, may be any one or more suitable controllers, processors, state machines or the like capable of executing scripts or instructions of one or more software programs stored in the electronic system 500 (e.g., within the memory 540). In some embodiments, the processor 530 may be implemented with a hardware controller, a processor, a state machine, or other circuits to provide the functionality of the processor 530 executing instructions stored in the memory 540.

The processor 530 may execute the input device control SW module 544 to detect the presence or motion associated with an input object through the input device 510. In some implementations, the processor 530 may execute the input device control SW module 544 to operate the input device 510 in a first mode of operation to detect input objects within a sensing region of the input device 510 by evaluating electric field data associated with a first sensor electrode and a second sensor electrode. In addition, the processor 530 may execute the input device control SW module 544 to operate the input device 510 in a second mode of operation to detect input objects in contact with a conductive guide by evaluating electric field data associated with the first sensor electrode or associated with the first sensor electrode and a third sensor electrode.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An electronic system comprising:
a case;
an input device comprising:
a substrate comprising a first sensor electrode configured to sense an electric field within a sensing region;
a conductive guide, separate from the substrate, comprising:
a first portion disposed outside the case and configured to contact an input object outside the sensing region; and
a second portion disposed inside the case and configured to interact with the electric field; and
a processing system configured to:
receive electric field data from the first sensor electrode based on the sensing of the electric field;
detect changes in the electric field based on the received electric field data; and
determine whether the input object is in contact with the first portion of the conductive guide based at least in part on the received electric field data.

2. The electronic system of claim 1, wherein a dielectric constant of the conductive guide is sufficiently different from a dielectric constant of the case to enable the input device to distinguish a response due to the input object being within the sensing region.

3. The electronic system of claim 1, wherein a dielectric constant of the conductive guide is different from a dielectric constant of the case by at least a factor of two.

4. The electronic system of claim 1, wherein the case is a conductive case, the electronic system further comprising:
an insulator disposed between the conductive guide and the case and configured isolate the conductive guide from the case.

5. The electronic system of claim 4, wherein a dielectric constant of the case is at least twice the dielectric constant of the conductive guide.

6. The electronic system of claim 1, wherein the substrate comprises:
a second sensor electrode configured to receive an electric field from the first sensor electrode, wherein the second sensor electrode is disposed between the conductive guide and the first sensor electrode.

7. The electronic system of claim 6, wherein the conductive guide is configured to affect the electric field from the first sensor electrode when in contact with the input object.

8. The electronic system of claim 1, wherein the conductive guide is mounted through, and supported by, the case.

9. An input device comprising:
one or more processors; and
a memory storing instructions that, when executed by the one or more processors, cause the input device to:
receive electric field data from a first sensor electrode disposed on a substrate, the first sensor electrode being configured to sense an electric field within a sensing region;
detect changes in the electric field based on the received electric field data; and
determine whether an input object outside the sensing region is in contract with a conductive guide, separate from the substrate, based at least in part on the received electric field data, the conductive guide having a first portion disposed outside a case of the input device and a second portion disposed inside the case.

10. The input device of claim 9, wherein a dielectric constant of the conductive guide is sufficiently different from a dielectric constant of the case to enable the input device to distinguish a response due to the input object being within the sensing region.

11. The input device of claim 9, wherein a dielectric constant of the conductive guide is different from a dielectric constant of the case by at least a factor of two.

12. The input device of claim 9, wherein the case is a conductive case, the input device further comprising:
an insulator disposed between the conductive guide and the case and configured isolate the conductive guide from the case.

13. The input device of claim 12, wherein a dielectric constant of the case is at least twice a dielectric constant of the conductive guide.

14. The input device of claim 9, wherein the substrate comprises:
a second sensor electrode configured to receive an electric field from the first sensor electrode, wherein the second sensor electrode is disposed between the conductive guide and the first sensor electrode.

15. The input device of claim 14, wherein the conductive guide is configured to affect the electric field from the first sensor electrode when in contact with the input object.

16. The input device of claim 9, wherein the conductive guide is mounted through, and supported by, the case.

* * * * *

UNITED STATES PATENT AND TRADEMARK OFFICE
CERTIFICATE OF CORRECTION

PATENT NO. : 10,976,876 B2
APPLICATION NO. : 16/439049
DATED : April 13, 2021
INVENTOR(S) : Tetsuo Tanemura It is certified that error appears in the above-identified patent and that said Letters Patent is hereby corrected as shown below:

In the Claims

In Column 14, Line 37, in Claim 9, delete "contract" and insert -- contact --

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*